(12) United States Patent
Kwan

(10) Patent No.: US 6,305,485 B1
(45) Date of Patent: Oct. 23, 2001

(54) MOUNTING AND GEARING SYSTEM FOR POWER-ASSISTED BICYCLES

(76) Inventor: Seek In Kwan, 3008 Kentridge Dr., San Jose, CA (US) 95133

( * ) Notice: Subject to any disclaimer, the term of this patent is extended or adjusted under 35 U.S.C. 154(b) by 0 days.

(21) Appl. No.: 09/566,030

(22) Filed: May 8, 2000

(51) Int. Cl.$^7$ .................................................. B62D 61/02
(52) U.S. Cl. ........................................... 180/221; 180/205
(58) Field of Search .................................. 180/205, 206, 180/207, 198, 11, 220, 221

(56) References Cited

U.S. PATENT DOCUMENTS

| | | | | |
|---|---|---|---|---|
| 656,323 | * | 8/1900 | Hansel | 180/205 |
| 3,713,502 | * | 1/1973 | Delaney et al. | 180/205 |
| 3,827,519 | * | 8/1974 | Snider | 180/205 |
| 4,267,898 | * | 5/1981 | Wheaton | 180/205 |
| 5,937,964 | | 8/1999 | Mayer . | |
| 6,011,366 | | 1/2000 | Murakami . | |
| 6,024,186 | * | 2/2000 | Suga | 180/205 |

FOREIGN PATENT DOCUMENTS

| | | | | |
|---|---|---|---|---|
| 21673 | * | 1/1942 | (DK) | 180/205 |
| 868794 | * | 1/1942 | (FR) | 180/205 |

\* cited by examiner

*Primary Examiner*—Daniel G. DePumpo

(57) ABSTRACT

A mounting and gearing system for power-assisted bicycles comprising a system frame 12 that mounts to brake posts 14 and to an axle clamp bolt 22 of a bicycle 21, an extension arm 3 use extension arm bolts 33 to bolt to an electric motor 1, that has square flanges at each end, so that one corner will pivot on a motor pivot tube 13 on the system frame 12, the extension arm 3 with adjustment slots 23 are used to vary the tension of a primary drive belt 18 that connects a motor pulley 2 and a clutch pulley 4, a clutch sprocket 10 is pressed on a roller clutch 9 that rides on a clutch shaft 8 supported by a pair of support bearings 7 that are sandwiched between a bolster plate 6 and the extension arm 3 using standoffs 5, the clutch sprocket 10 connects to a wheel sprocket 11 via a secondary drive chain 19, the wheel sprocket 11 is connected to a tire 20 via wheel spokes 28 and a wheel hub 27, the tension of the secondary drive chain 19 is adjusted using a support strut 17 that mounts on the standoffs 5 and a support strut mount 16.

4 Claims, 4 Drawing Sheets

10

31

32

MOUNTING AND GEARING SYSTEM FOR POWER-ASSISTED BICYCLES

FIELD OF INVENTION

This invention relates to power-assist drives for bicycles, specifically to improve the way a power-assist system is mounted and how it will drive a wheel.

BACKGROUND OF INVENTION

Power assist manufacturers are supplying consumers with power-assist drives that power bicycles. These power-assist systems drive either the front or rear tire enabling forward movement. Such systems provide a viable alternative to pedaling and add an enjoyment to riding. Most systems on the market today consist of either friction or direct drive systems.

Friction drive systems, like U.S. Pat. No. 5,491,390 to McGreen (1996), comprise the majority of what is on the market today. Friction drive systems consist of electric motors that are connected to rollers or belts that contact the tire patch. These systems are mounted on the bicycle frame for use on either the front or rear tire. The rollers or belts are manually or automatically clamped down onto the tire when power is applied. When the electric motors are on and turning, the frictional contact between the tire and the roller or belt causes the wheel of the bicycle to turn in unison. The drawbacks to these systems are:

(a) increased wear and tear of the tire when used as a driving surface, (b) traction is lost when the tire gets wet, (c) tires need to have smooth surfaces to maximize contact to the roller or drive belt, (d) road dirt and grime collects on the roller or belt when contacting tire.

All these problems would be eliminated if we went to direct drive systems that use a system of gears or hub motors to drive the rim of the wheel instead of the tire patch.

Like friction drive systems, gear drive systems are implemented on either the front or rear tire of a bicycle. Gear drive systems comprise of an electric motor mounted to the bicycle frame with a chain or belt affixed to a gear on the motor shaft and a gear on the tire rim. When power is applied, the motor turns the wheel. Many gear systems require installing long chains or belts that can snag or get caught on something during operation. Some of these systems are single stage systems that require very small gears at the motor shaft and very large gears attached to the rim in order to achieve a ratio comparable to turn the wheel. Still other systems require pedaling before the motor will start to spin. Other systems, like U.S. Pat. No. 5,937,964 to Mayer et al. (1999), mount on the side of the rear wheel that leave its components protruding pass the bicycle's centerline increasing the possibility for tremendous damage when an obstruction gets tangled during forward movement.

Hub motor drives are another type of direct drive system. An electric motor is either confined within the hub or it is the hub of the wheel itself. This hub rides on its axis and is connected to the rim and tire via spokes. When power is applied to the hub motor, the whole wheel turns in reference to the hub axis that supports the entire wheel. Hub drive systems can be used on either the front or rear wheel of a bicycle. The biggest drawback to a hub system is cost. Hub motors need to be custom designed to fit within the confines of a wheel within a bicycle frame. Because of this confinement, the choice of motors are limited to smaller and less powerful motors that will degrade performance trying to keep costs reasonable. Most hub drives are custom designs and are not derived from off-the-shelf components. These designs are fixed and not easily modified for different terrain.

All of these inventions assist bicyclists on their rides. They provide viable alternatives to pedaling. However, we need a system that is a better alternative to current frictional and direct drive systems that use off-the-shelf parts and will give the user an ability to easily customize the assist system to their personal tastes and terrain.

SUMMARY

My mounting and gearing system for power-assisted bicycles provides a lightweight, compact design that solves the many disadvantages with current frictional and direct drive systems.

OBJECTS AND ADVANTAGES

The mounting and gearing system for power-assisted bicycles solves many of the drawbacks that the mentioned prior arts have. Several objects and advantages of the present invention are:

(a) to provide a drive eliminating tire slip inherent in frictional roller drives.

(b) to provide a drive comparable to gear driven systems that places its components within the centerline of the bicycle.

(c) to provide a drive comparable to hub driven systems, but without the high cost of custom internal gear designs.

(d) to provide a freedom to choose different tire combinations for varying terrain, unlike the specific tires needed in frictional driven systems.

(e) to provide an ability to easily change drive ratios to meet each and everyone's personal needs.

(f) to provide a design that uses off-the-shelf components that can be readily replaced or modified without relying on the manufacturer for customized parts.

Further objects and advantages are to provide a lightweight, compact design that can be mounted and dismounted within minutes to any bicycle. The invention will also provide a wide range of possible ratios to compliment the type of torque and power a specific motor can deliver.

Figure 1:
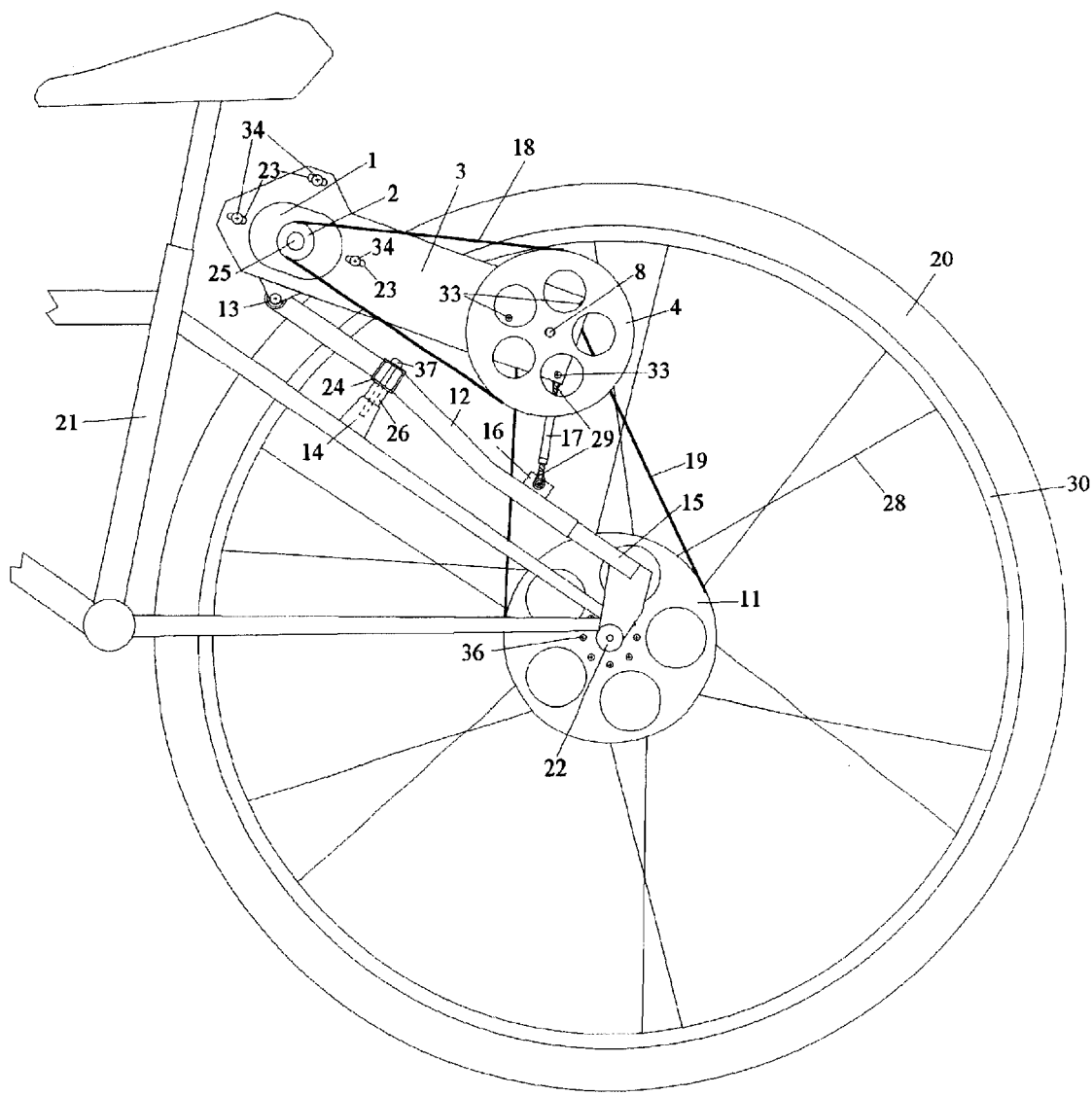
FIG. 1 shows the system mounted on the rear of a bicycle.

REFERENCE NUMERALS IN DRAWINGS 1 electric motor
2 motor pulley
3 extension arm
4 clutch pulley
5 standoffs 6 bolster plate
7 support bearings
8 clutch shaft
9 roller clutch
10 clutch sprocket
11 wheel sprocket
12 system frame
13 motor pivot tube
14 brake posts
15 extension drop-out
16 support strut mount
17 support strut
18 primary drive belt
19 secondary drive chain
20 tire
21 bicycle
22 axle clamp bolt
23 adjustment slots
24 brake mounts
25 motor shaft
26 spacers
27 wheel hub
28 wheel spokes
29 rod ends
30 rigid rim
31 retaining ring
32 washer
33 roller assembly bolts
34 extension arm bolts
35A small backing plate
35B large backing plate
36 hub bolts
37 brake post bolt

DESCRIPTION OF INVENTION

Figure 3:
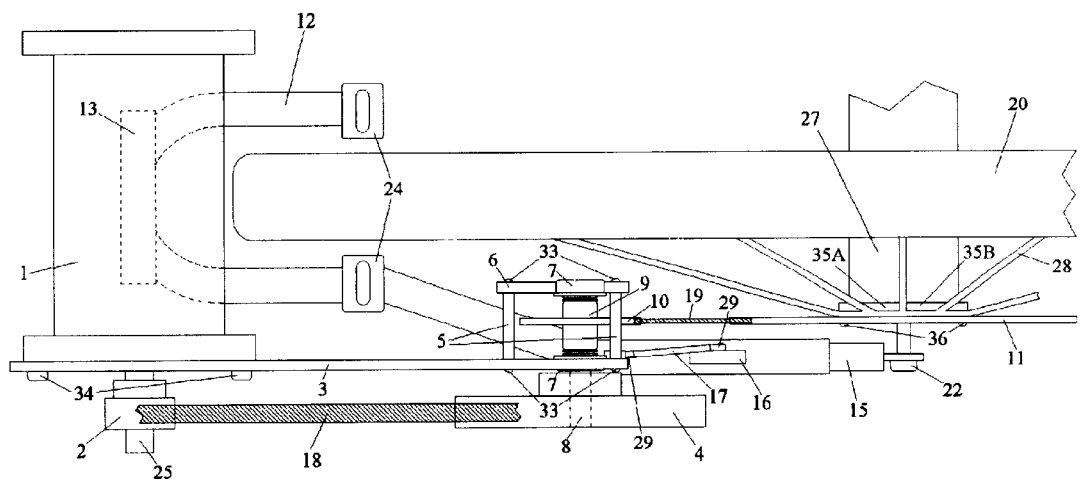
FIG. 3 shows the top view of the system with tire.

A typical embodiment of the mounting and gearing system for power-assisted bicycles is illustrated in FIG. 1 and FIG. 3. The mounting system consists of a system frame 12 that mounts to brake posts 14 and an axle clamp bolt 22 of the bicycle 21. A brake post bolt 37 is used to mount brake mounts 24 to the brake posts 14. Spacers 26 provides clearance for the system frame 12 to the brake posts 14. An extension drop-out 15 is used for fine adjustments when mounting the system frame 12 to the axle clamp bolt 22. An electric motor 1, with square flanges on both ends, uses one of its corners to pivot on a motor pivot tube 13 that is part of the system frame 12.

Figure 4:
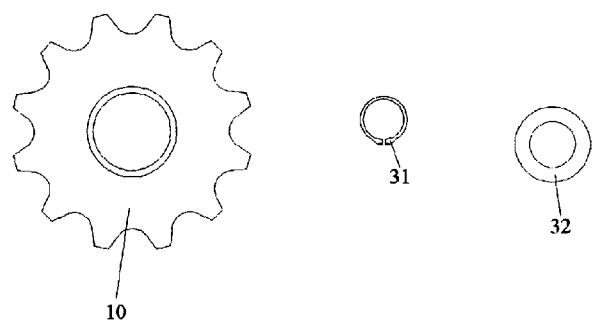
FIG. 4 shows the front view of some parts for the roller clutch assembly.

Illustrated in FIG. 4 is a front view of a clutch sprocket 10, a retaining ring 31 and a washer 32.

Figure 2:
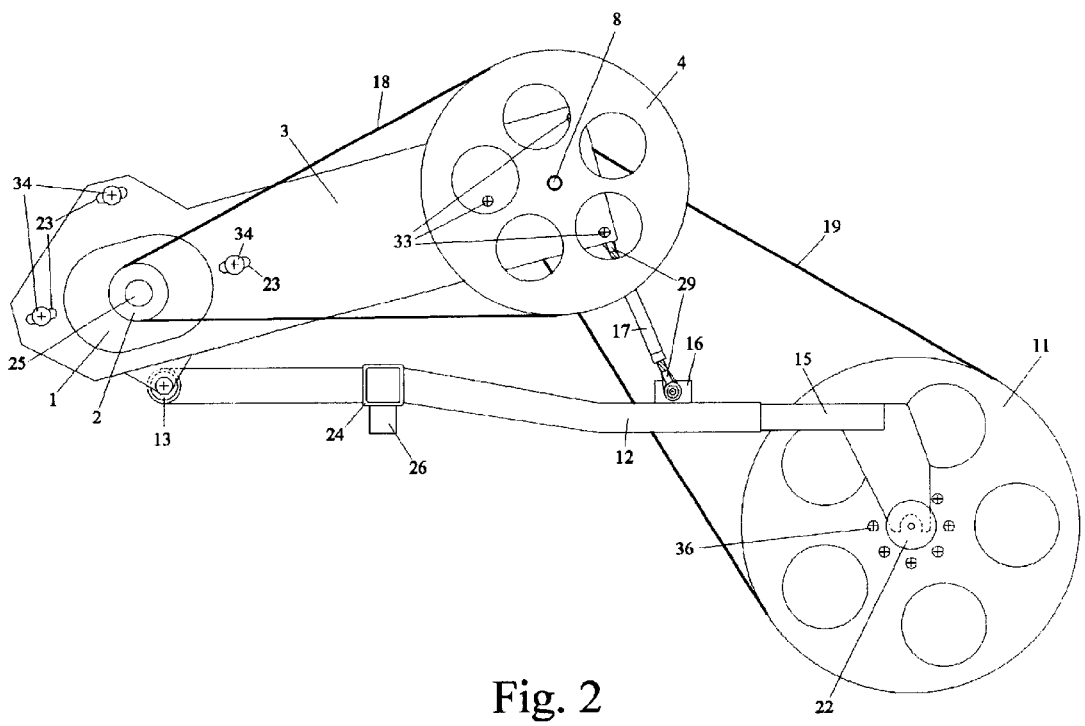
FIG. 2 shows a enlarged view of the system without the bicycle.
Figure 5:
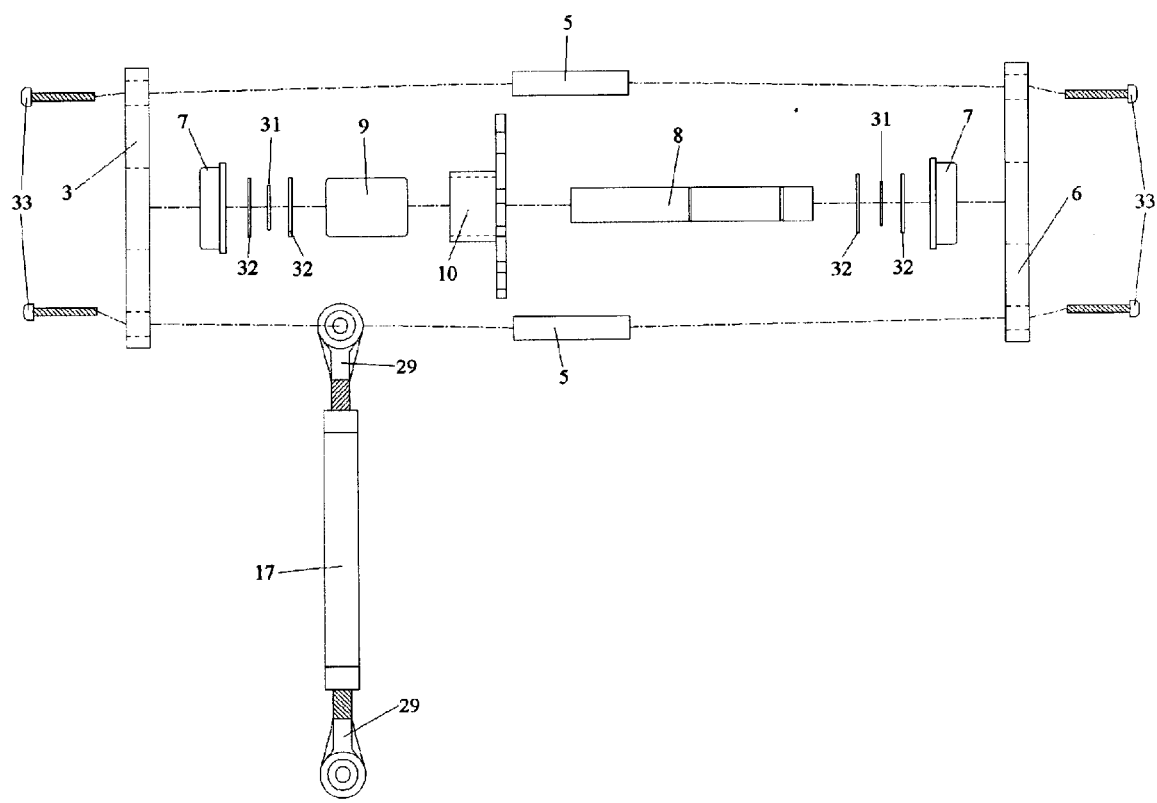
FIG. 5 shows the roller clutch assembly.
Figure 6:
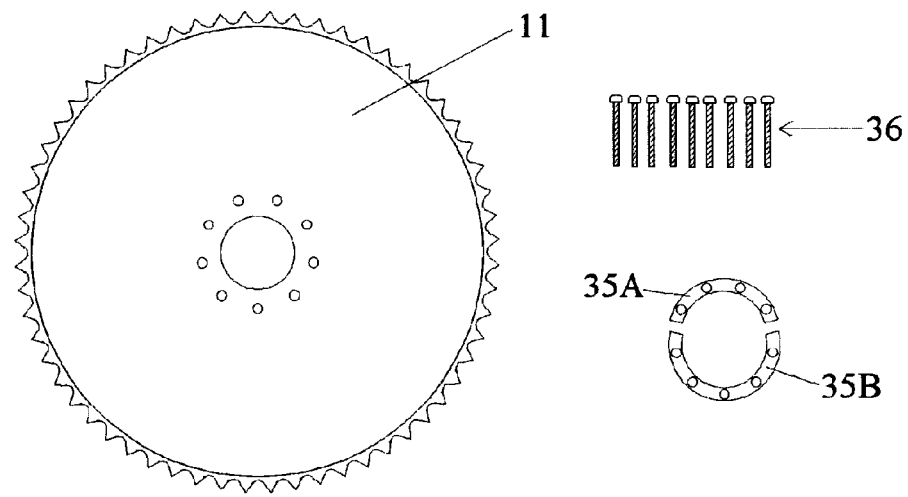
FIG. 6 shows the front view of some parts for the hub assembly.
Figure 7:
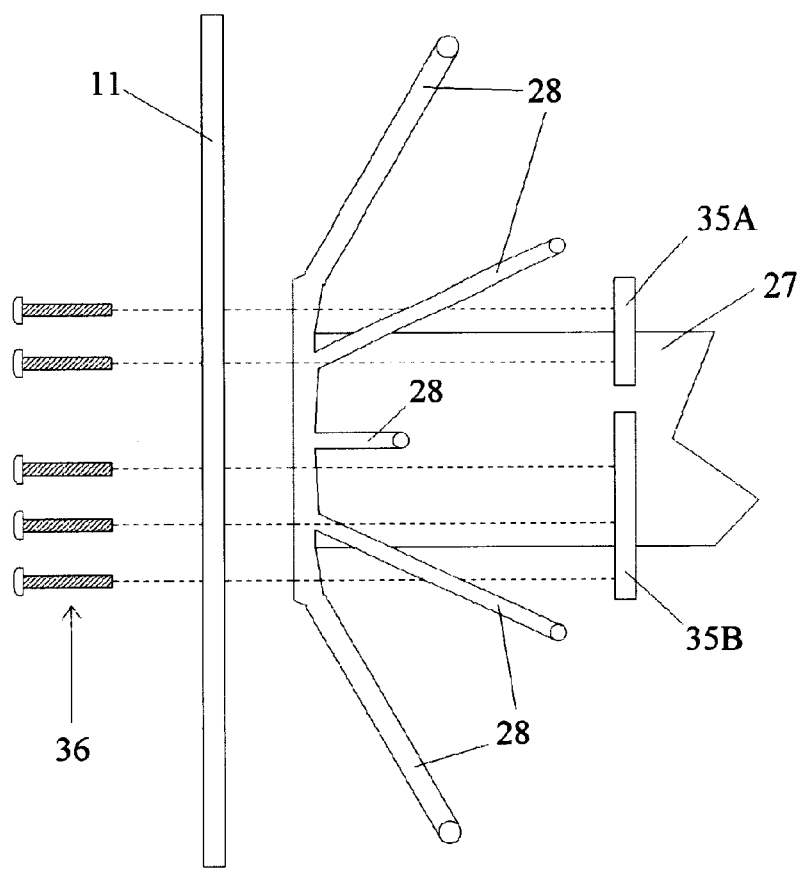
FIG. 7 shows the hub assembly.

Illustrated in FIG. 5 is an extension arm 3 and a bolster plate 6, used in conjunction with standoffs 5 and roller assembly bolts 33, to sandwich a roller clutch 9 supported by support bearings 7 and a clutch shaft 8, whereby the clutch sprocket 10 is pressed onto the roller clutch 9. The retaining ring 31 is used on each side of the clutch shaft 8 to center the roller clutch 9. The washer 32 is used to prevent the roller clutch 9 and the support bearings 7 from binding with the retaining ring 31. Illustrated in FIG. 2 is a support strut 17 supporting the extension arm 3, connected to one of the standoffs 5, and to a support strut mount 16 on the system frame 12. The clutch sprocket 10 is connected to a wheel sprocket 11 via a secondary drive chain 19. The wheel sprocket 11 is connected to a wheel hub 27 by sandwiching wheel spokes 28 between the wheel sprocket 11 and a small backing plate 35A and a large backing plate 35B with hub bolts 36 as illustrated in FIG. 6 and FIG. 7. The small backing plate 35A and the large backing plate 35B are used in conjunction for installation on an already made wheel. The wheel hub 27 is connected to a rigid rim 30 via the wheel spokes 28. A tire 20 rides on the rigid rim 30. The clutch shaft 8 is also connected to a clutch pulley 4 that is connected to a motor pulley 2 on a motor shaft 25 via a primary drive belt 18.

The tension of the primary drive belt 18 is tightened by sliding the extension arm 3 further away from the electric motor 1 by way of adjustment slots 23 made into the extension arm 3. An extension arm bolts 33 are used to tighten the extension arm 3 to the electric motor 1 after adjustments are made. The angle of the extension arm 3 that pivots, with the electric motor 1, relative to the system frame 12 is changed using the support strut 17 consisting of rod ends 29 at both ends that are opposite threaded. Twisting the support strut 17, while connected to the extension arm 3, via the standoffs 5, and the support strut mount 16 causes it to increase or decrease in length changing the angle of the extension arm 3 relative to the system frame 12 and the tension of a secondary drive chain 19.

OPERATION OF INVENTION

My mounting and gearing system for power-assisted bicycles uses an electric motor 1, powered by any source of electrical energy whether generated or stored, to turn a motor pulley 2 on a motor shaft 25. The motor pulley 2 turns a clutch pulley 4 via a primary drive belt 18. The clutch pulley 4 turns a roller clutch 9 via a clutch shaft 8. A clutch sprocket 10, pressed onto the roller clutch 9, turns a wheel sprocket 11 via a secondary drive chain 19. The wheel sprocket 11 is connected to a wheel hub 27 using a small backing plate 35A, a large backing plate 35B, and hub bolts 36. The wheel hub 27 connects to a rigid rim 30 via wheel spokes 28. The rigid rim 30 supports a tire 20. The tire 20 will turn in unison with the electric motor 1 when power is applied. The roller clutch 9 will enable the tire 20, the rigid rim 30, the wheel spokes 28, the wheel hub 27, the wheel sprocket 11, the secondary drive chain 19, and the clutch sprocket 10 to continue to spin when no power is applied to the electric motor 1.

CONCLUSION, RAMIFICATIONS, AND SCOPE OF INVENTION

In conclusion, the reader will see that the mounting and gearing system for power-assisted bicycles is a lightweight and a compact design that will alleviate the many disadvantages found in the prior art.

While the mounting and gearing system for electric bicycle description contains many specificity's, these should not be construed as limitations on the scope of the invention, but rather as and exemplification of one preferred embodiment thereof. Many other variations are possible. For example, the system frame can be mounted to the frame via clamps. The primary and secondary drives can either be driven by belts, chains, or shafts using any combination of gears or pulleys. The support strut that uses opposite threaded rod ends for adjustments to the tension of the secondary drive system can be replaced with piston like struts that can be extended or retracted for varying lengths. The roller clutch can be replaced with a sprag clutch or a non-freewheeling fixed sprocket. The electric motor can be replaced by an internal combustion engine. The support strut can be positioned on the electric motor to support the extension arm and tension adjustments for the secondary drive chain.

Thus the scope of the invention should be determined by the appended claims and their legal equivalents, rather than by the examples given.

I claim:

1. A mounting and gearing system for power-assisted bicycles comprising (a) top mounted rear brake posts on a bicycle, (b) a system frame mounted on said top mounted rear brake posts, (c) said system frame comprising a slotted portion to compensate the varying widths of said top mounted rear brake posts, an arm extending downward to attach to an axle clamp, and a loop extending up and above a wheel of said bicycle, (d) an electric motor, with square flanges at both ends, mounted on said system frame whereby one of the corners of said square flanges pivots on said loop, (e) an extension arm mounted on said electric motor, (f) a primary drive residing around said extension arm comprise a motor pulley on said electric motor connected to a clutch pulley on said extension arm, via a belt, (g) said extension arm is adjustable in reference to said electric motor so that the tension of said belt can be adjusted, (h) said clutch pulley is mounted to a shaft containing a freewheeling clutch, (i) said shaft rides on bearings supported by said extension arm, (j) a secondary drive residing on one end of said extension arm, opposite said electric motor, and said wheel, (k) a clutch sprocket is mounted to said freewheeling clutch that is connected to a sprocket mounted to said wheel, via a chain, (l) a strut mounted to said extension arm and said system frame is adjustable so that the tension of said chain can be adjusted.

2. The mounting and gearing system for power-assisted bicycles of claim 1, wherein said primary drive and said secondary drive use a means of conveying motion using a plurality of gears, belts, chains, or shafts.

3. The mounting and gearing system for power-assisted bicycles of claim 1, wherein said electric motor is replaced with an internal combustion engine.

4. The mounting and gearing system for power-assisted bicycles of claim 1, wherein said freewheeling clutch is replaced with a fixed sprocket.

* * * * *